United States Patent
Throngnumchai

[11] Patent Number: 5,841,127
[45] Date of Patent: Nov. 24, 1998

[54] POSITION SENSOR

[75] Inventor: Kraisorn Throngnumchai, Yokohama, Japan

[73] Assignee: Nissan Motor Co., Ltd., Kanagawa, Japan

[21] Appl. No.: 815,360

[22] Filed: Mar. 11, 1997

[30] Foreign Application Priority Data

Mar. 11, 1996 [JP] Japan .................................. 8-082031

[51] Int. Cl.⁶ .................................................. H01J 40/14
[52] U.S. Cl. .................................. 250/208.1; 250/208.2; 250/214 LA; 356/222
[58] Field of Search .................. 250/208.2, 208.1, 250/201.5, 203.4, 214 R, 214 A, 214 LA; 356/222, 221, 375; 396/79, 80, 121; 330/308

[56] References Cited

U.S. PATENT DOCUMENTS

| | | | |
|---|---|---|---|
| 4,561,753 | 12/1985 | Plummer et al. | 356/222 |
| 5,483,060 | 1/1996 | Sugiura et al. | 250/237 R |
| 5,555,060 | 9/1996 | O'Brien et al. | |
| 5,576,830 | 11/1996 | O'Brien et al. | 356/373 |

OTHER PUBLICATIONS

S. Middelhoek et al. "*Silicon Sensors*" pp. 62–63, 83–85 Akademic Press 1989.

*Primary Examiner*—Que Le
*Attorney, Agent, or Firm*—McDermott, Will & Emery

[57] ABSTRACT

Photodiodes are situated in a row over a line segment having a predetermined width. Current generated by at least one of the photodiodes is converted into voltage by a resistor. This voltage is amplified by first MOSFETs that are connected at drains thereof in parallel to a source of voltage with a resistor between the adjacent two thereof. This voltage is amplified by second MOSFETs that are connected at drains thereof in parallel to the source of voltage. The first MOSFETs produce a first output signal that id dependent on the position at which the incident light fall on the photodiodes. The second MOSFETs produce a second output signal that is independent from the position of the incident light. A divider calculates a ratio between the first and second output signals. This ratio is indicative of information of the position of the incident light.

22 Claims, 8 Drawing Sheets

POSITION SENSOR

BACKGROUND OF THE INVENTION

The present invention relates to position sensors, and in particular to position sensors to detect position of light spot.

Position-sensitive photodetectors (PSDs) are described on pages 82 to 85 of publication entitled "Silicon Sensors" written by S. MIDDELHOEK and S. A. AUDET and published by AKADEMIC PRESS. The operation of the PSDs is based on the lateral photoelectric effect, which is established by the non-uniform illumination of a junction diode. In general, a PSD is fabricated by placing a pair of Ohmic contacts on opposite borders of one surface, i.e., the n-surface of a p-n junction. In this way, the lateral photo-voltage V(x) resulting from the lateral photoelectric effect can be measured. V(x) will vary in magnitude and polarity as the localized light spot is moved between the two contacts. From this voltage, the x-coordinate of the spot can be obtained if the intensity of the light is known.

FIGS. 1–4 shows an equivalent circuit of a less preferred embodiment of a position sensor 100 according to the present invention. A plurality, four in this illustration, of photodiodes D1, D2, D3, and D4 are situated in a row in an equidistant manner between a pair of Ohmic contacts, namely A contact and B contact, that are spaced by a distance L. The A and B contacts are grounded. The photodiodes D1, D2, D3, and D4 are connected at one ends to a source of voltage V. The opposite ends of them are connected one after another via a resistor R that forms a part of an electric current path interconnecting the A and B contacts. Specifically, the electric current path includes n−1 resistors R, where, n is the number of photodiodes.

Figure 15:
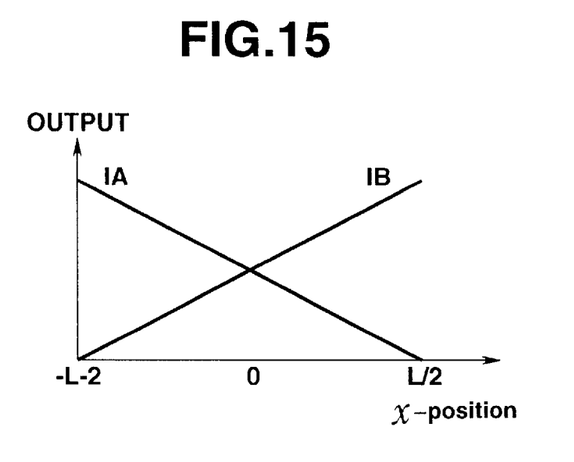
FIG. 15 shows an output characteristic chart.

The operation of the position sensor 100 is explained. If the photodiode D2 is illuminated by the light, electric current is generated. The magnitude of the current is proportional to the intensity of the light. The flow of the current splits at a junction C into a flow component IA toward the A contact and a flow component IB toward the B contact. The magnitude of electric current of the flow component IA is inversely proportional to the total of resistance from the photodiode D2 to the B contact. The magnitude of electric current of the flow component IB is inversely proportional to the total of resistance from the photodiode D2 to the A contact. The magnitude of resistance from the photodiode D2 to the A contact is proportional to the distance between them. The magnitude of resistance from the photodiode D2 and the B contact is proportional to the distance between them. If 0 (zero) of the x-coordinate is adjusted to the middle of the row of photodiodes D1, D2, D3, and D4, the IA and IB will vary in magnitude as illustrated in FIG. 15 as the localized light spot is moved between the A and B contacts. If x on the x-coordinate indicates the position of the photodiode D2, the IA and IB are inversely proportional to (L+x)/2 and (L−x)/2, respectively. From this relation, the x-position of the photodiode D2 that is illuminated by the localized light spot can be obtained by calculating the following equation.

$$x = (L/2)(IB - IA)/(IB + IA).$$

Figure 16:
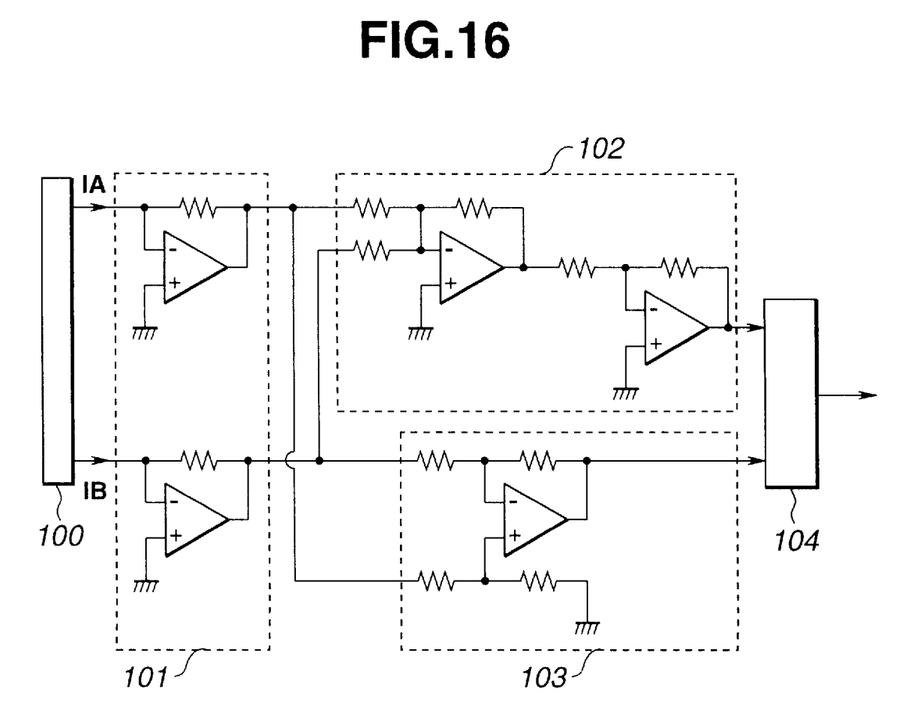
FIG. 16 shows a signal processing according to the less preferred embodiment.

FIG. 16 shows one example of a signal processing circuit. The position sensor 100 feeds the current IA and IB to corresponding current to voltage converters 101, respectively, where current to voltage conversion is carried out. The converters 101 feed their voltage outputs to two input terminals of an adder 102, respectively and also to two input terminals of a subtracter 103, respectively. The adder 102 and subtracter 103 feed their outputs to two input terminals of a divider 104 where the result of subtraction is divided by the result of addition thereby giving the x-position.

From the above description, it will be understood that the use of the position sensor 100 makes signal process circuit complicated and bulky since the adder and subtracter are required in addition to the divider.

According to the position sensor 100, the current induced at the photodiode is too weak to possess sufficiently high load drive capability. It takes a long propagation time for the current to reach the A and B contacts that are in turn connected to the current to voltage converters, respectively. This, results in slow processing, making it difficult to find its application in the field where high-speed information processing is required.

According the position sensor 100, for position measurement with high precision, each of the resistors, which are connected in series between the A and B contacts, must have a resistance value sufficiently high as compared to that of the output resistor of the source of voltage and that of the input resistor of load of each of the current to voltage converters. This results in an increase of the resistance value of a train of the resistors between the A and B contacts. As the thermal noise produced by the resistors is proportional to the resistance value, the position sensor 100 shows a low signal to noise (S/N) ratio.

An object of the present invention is to provide a position sensor that makes it easy to calculate the position of the localized light spot and shows an increased S/N ratio.

SUMMARY OF THE INVENTION

According to one aspect of the present invention, there is provided a position sensor comprising:

a plurality of photodetectors in a row, each of said plurality of photodetectors being operative to convert optical energy of incident light that falls thereon to electrical energy to generate electrical signal;

a first amplifier circuit operative to amplify the generated electrical signal to produce a first output signal that depends on position at which the incident light falls on said plurality of photodetectors; and a second amplifier circuit operative to amplify the generated electrical signal to produce a second output signal that is independent from the position at which the incident light falls on said plurality of photodetectors.

According to another aspect of the present invention there is provided a method for locating position on a row of a plurality of photodetectors, at which incident light falls on the plurality of photodetectors, the method comprising the steps of:

producing a first output signal that depends on position at which the incident light falls on the plurality of photodetectors;

producing a second output signal that is independent from the position at which the incident light falls on the plurality of photodetectors; and calculating a ratio between said first and second output signals as information of the position.

DESCRIPTION OF THE PREFERRED EMBODIMENTS

Figure 1:
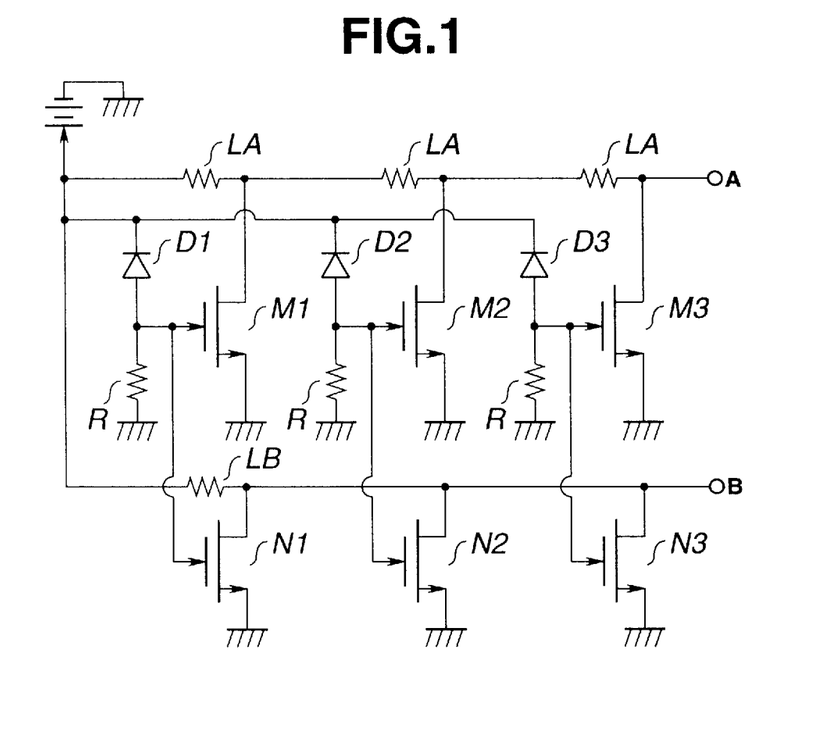
FIG. 1 shows an equivalent circuit of a first preferred embodiment of a position sensor according to the present invention.

In FIG. 1, there is used a train of a plurality, three in this embodiment, of photodetectors D1, D2, and D3 that are situated equidistant in a row over a straight line segment with a length L. FIG. 1 illustrates schematically three photodiodes, namely, a left-hand photodiode D1, a center photodiode D2 and a right-hand photodiode D3, as the photodetectors, At one ends thereof, the photodiodes D1, D2, and D3 are connected in parallel to a source of voltage. At the opposite ends thereof, the photodiodes D1, D2, and D3 are grounded through respective resistors R having the same resistance value. Owing to this circuit, electric current induced at each of the photodiodes D1, D2, and D3 is converted to voltage across the associated resistor R. The resistor R, which is connected to the photodiode D1, is connected to a gate of a MOSFET (metal oxide semiconductor field effect transistor) M1 and also to a gate of a MOSFET N1 thereby applying the voltage to the gates of MOSFETs M1 and N1. The resistor R, which is connected to the photodiode D2 is connected to a gate of a MOSFET (metal oxide semiconductor field effect transistor) M2 and also to a gate of a MOSFET N2 thereby applying the voltage to the gates of MOSFETs M2 and N2. The resistor R, which is connected to the photodiode D3, is connected to a gate of a MOSFET (metal oxide semiconductor field effect transistor) M3 and also to a gate of a MOSFET N3 thereby applying the voltage to the gates of MOSFETs M3 and N3. The MOSFETs M1, M2, and M3 are grounded at their sources. Similarly, is the MOSFETs N1, N2, and N3 are grounded at their sources. The MOSFETs M1, M2, and M3 are connected at their drains to resistors LA, respectively. The resistors LA have the same resistance value ra and they are connected in series one after another between the source of voltage and a A-output terminal.

The resistors LA and the MOSFETs M1, M2, and M3 cooperate with each other to form a first amplifier circuit.

The MOSFETs N1, N2, and N3 are connected at their drains to the source of voltage via a resistor LB having a resistance value rb and also to a B output terminal.

The resistor LB and the MOSFETs N1, N2, and N3 cooperate with each other to form a second amplifier circuit.

In this embodiment, the MOSFETs M1, M2, and M3 have the same channel width and the same transconductance gm. Likewise, the MOSFETs N1, N2, and N3 have the same channel width and the same transconductance gm.

The operation of this embodiment is described.

When incident light falls on the photodiode D (D1, D2, D3), the photodiode under illumination generates current. This photogenerated current is converted to voltage by the resistor R connected between the photodiode under illumination and the ground. Since all of the resistors R have the same resistance value, if any one of the photodiodes is illuminated with the same incident light, the resistor R connected between the photodiode under illumination and the ground converts the photogenerated current to the same voltage. This voltage is applied to the MOSFET M (M1, M2, M3) and also to the MOSFET N (N1, N2, N3) which are connected at their gates to the photodiode under illumination. As mentioned before, the MOSFETs N1, N2, and N3 have the same channel width. Thus, each of the MOSFETs N1, N2, and N3 has the same amplification factor that is defined by the product of gm (transconductance) and rb (resistance value of the resistor LB). Thus, the voltage at the B output terminal remains unaltered even if the localized light spot due to the same incident light is moved from one to another of the photodiodes D1, D2, and D3.

The amplification factor of the MOSFET M1 is given by the product gm×ra, the amplification factor of the MOSFET M2 is given by the product gm×2ra, and the amplification factor of the MOSFET M3 is given by the product gm×3ra. In this manner, the amplification factor increases when the distance from the source of voltage of the MOSFET under illumination increases. Thus, the voltage at the A output terminal is proportional to the position at which the photodiode under illumination is placed.

Figure 2:
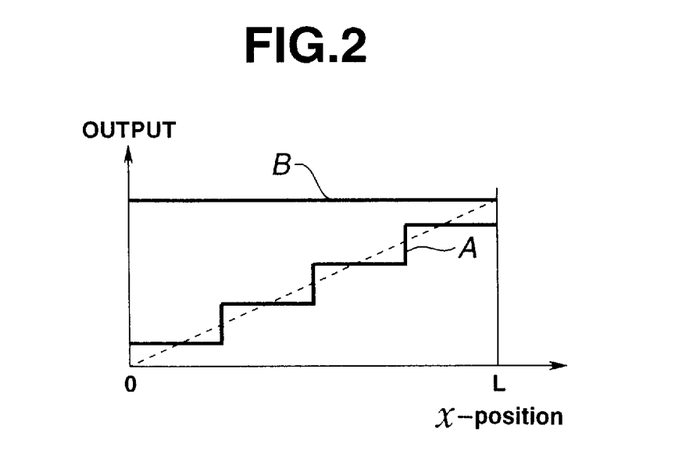
FIG. 2 shows an output characteristic chart.

FIG. 2 shows variation of the voltage at the B output terminal, hereinafter abbreviated as B-output, as the localized light spot due to the same incident light is moved. The light spot is moved from one end to the opposite end of the straight-line segment in which the photodiodes are situated in a row. The voltage at the A output terminal, hereinafter abbreviated as A-output, varies as the localized light spot is moved. With the same incident light, as the localized light spot is moved, the B-output remains unaltered, while the A-output varies in proportional relationship to the displacement of the localized light spot. The more the number of photodiodes within a region, the higher the precision of measurement becomes. In FIG. 2, the broken line illustrates plotting of the upper limits when the number of photodiodes is increased sufficiently. As is seen from the broken fine, the A-output is as high as the B-output at the L-position. Accordingly, x-position at which the localized light spot is placed can be given by calculating the equation as, $$x = \times (A\text{-output})/(B\text{-output}).$$

Figure 3:
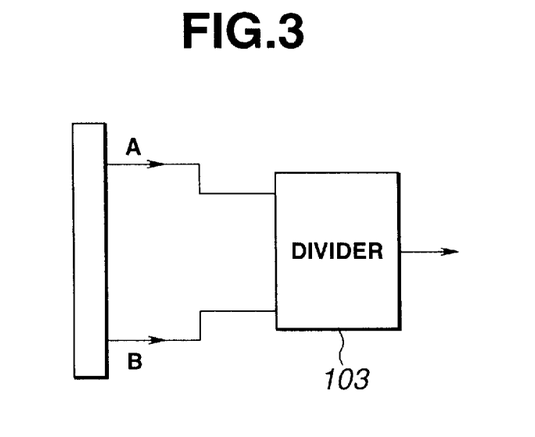
FIG. 3 shows a block diagram of a signal processing circuit.

FIG. 3 shows a signal processing circuit. This circuit consists of a divider. Thus, the size of the circuit can be reduced and the increase in operation speed can be expected. Integration on a chip can be facilitated. The photogenerated output is amplified immediately to gain sufficiently high load drive capability. This makes a great contribution to increase in operation speed thereby making it possible to find application of the position sensor in the filed where high speed operation is required.

In the previously described embodiment, the MOSFETs of the source grounded type are used as amplifiers. The present invention is not limited to the use of the amplifiers of the above type and may utilize amplifiers of other types as long as they have sufficiently high output resistance and do not interfere with each other when they are connected in parallel.

Figure 4:
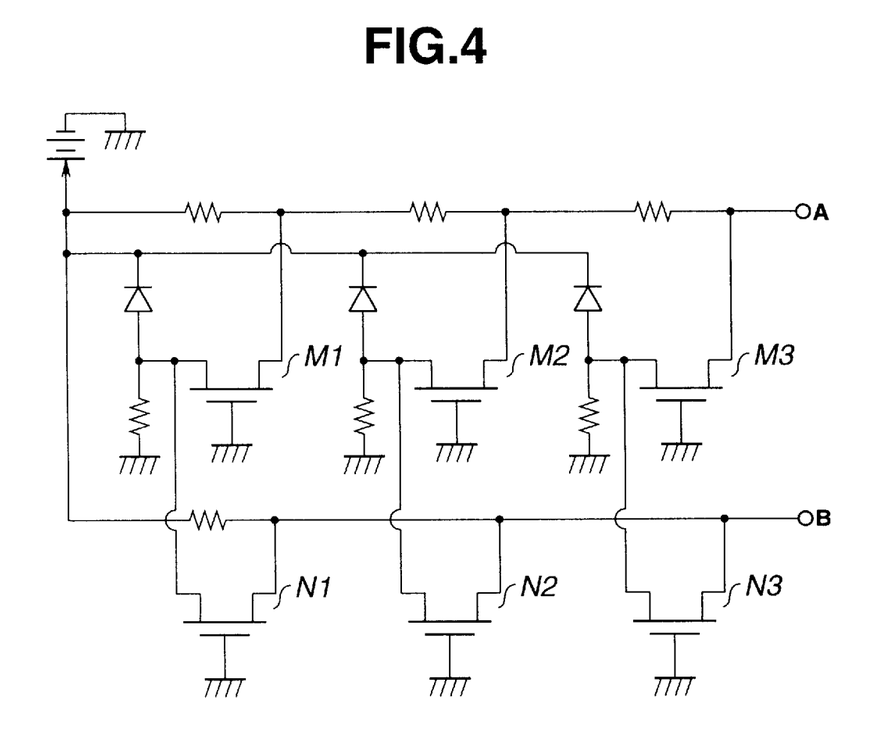
FIG. 4 shows an equivalent circuit of a first modification of the first preferred embodiment.

For example, as shown in FIG. 4, the use of MOSFETs of the gate grounded type is an another alternative option. In this case, the source of each of the MOSFETs is connected to one of photodiodes and the associated resistor. The use of the MOSFETs of the gate grounded type provides increased operation speed as compared to the MOSFETs of the source grounded type. The use of the MOSFETs of the source ground type reveals better noise suppression characteristics. Thus, one may choose appropriate one of them to fit its application.

Figure 5:
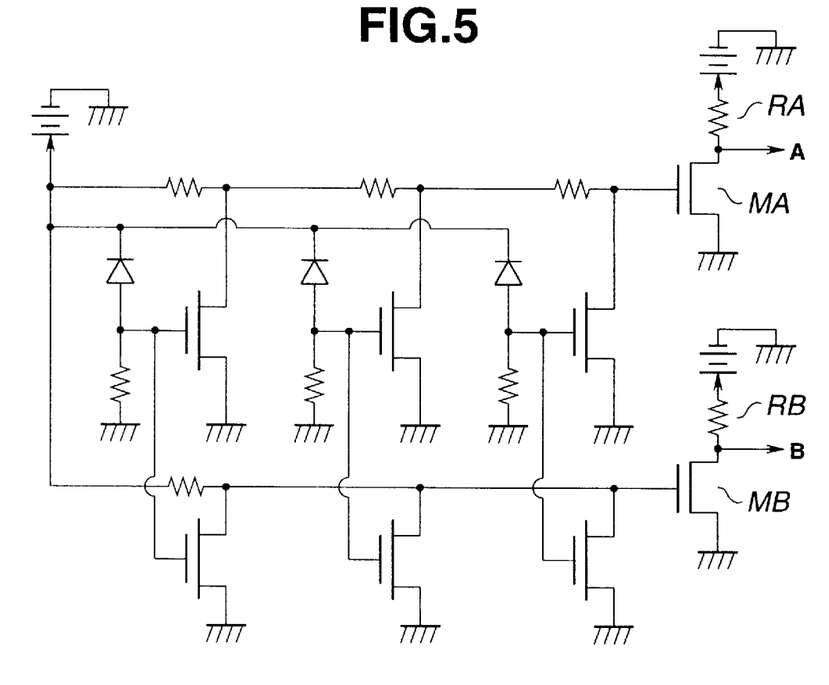
FIG. 5 shows an equivalent circuit of a second modification of the first preferred embodiment.

As shown in FIG. 5, a buffer composed of a resistor RA and a MOSFET MA may be provided to prevent any interference of the divider from propagating into the position sensor through the A output terminal. Likewise, a buffer composed of a resistor RB and a MOSFET MB may be provided to prevent any interference of the divider from propagating into the position sensor through the B output terminal.

Figure 6:
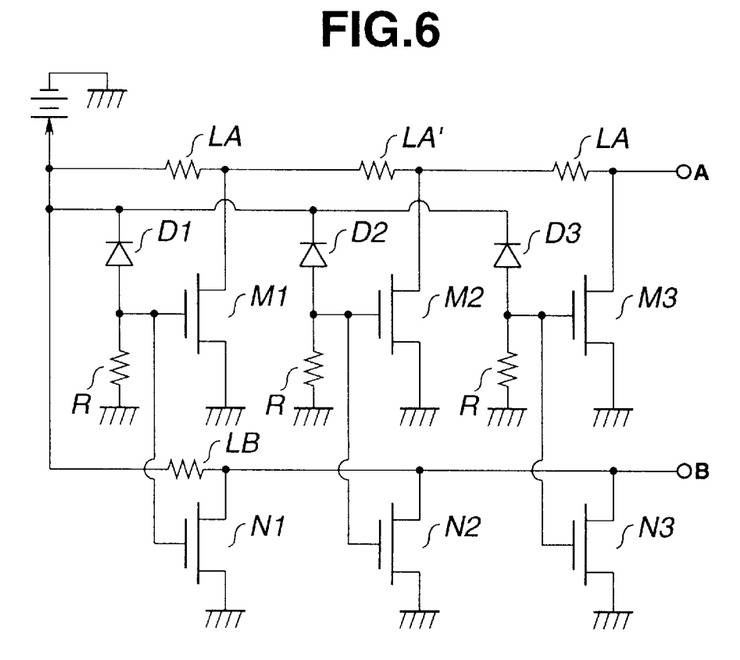
FIG. 6 shows an equivalent circuit of a second preferred embodiment of a position sensor according to the present invention.
Figure 7:
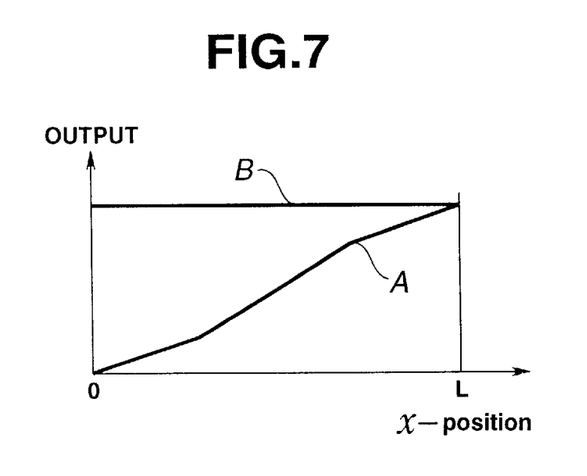
FIG. 7 shows an output characteristic chart according to the second embodiment.

FIG. 6 shows the second embodiment. This embodiment is substantially the same as the first embodiment except that a resistor LA' disposed in the center portion of a train of resistors LA, LA' and LA has a resistance value greater than that of each of the other resistors LA. This arrangement gives the output characteristic as shown in FIG. 7. In FIG. 7, B output remains unaltered as the localized light is moved over the surface of the position sensor in the same manner as it was in the first embodiment. However, A-output has variable gradient characteristic. Specifically, the A output shows a steep gradient as the localized light spot is moved over the center portion of the position sensor, while it shows less steep gradient as the localized light spot is moved over edge portions of the position sensor.

According to this characteristic, the gradient is steep to give high resolution around the center portion. The position sensor possessing this characteristic is fit for application in position control. For example, with the position sensor according to this second embodiment, control of small changes in position of a robot arm relative to a screw-receiving hole is easy. This is because the resolution becomes high as the robot arm approaches the hole thereby making it easy to operate the robot arm to insert a screw into the hole.

Figure 8:
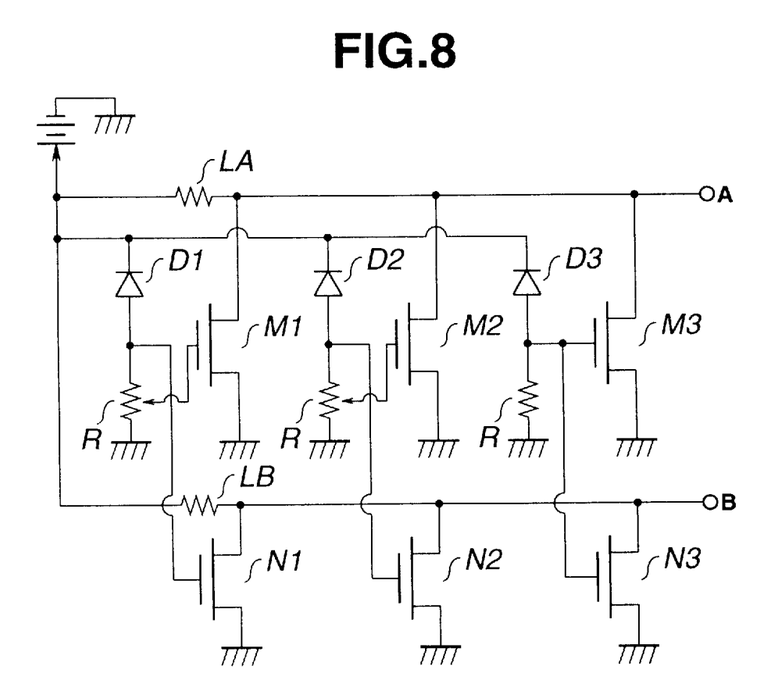
FIG. 8 shows an equivalent circuit of a third preferred embodiment of a position sensor according to the present invention.

FIG. 8 shows the third embodiment according to the present invention. This third embodiment is different from the first embodiment shown in FIG. 1 in that A-output is generated without relying on the train of resistors LA, LA, and LA (or LA, LA' and LA) which are connected to the MOSFETs M1, M2, and M3 at their drains, respectively.

In FIG. 8, the third embodiment is different from the first embodiment shown in FIG. 1 also in that MOSFETs M1, M2, and M3 are connected at their drains to A output terminal and also to a source of voltage via a resistor LA. Besides, gate voltages applied to gates of the MOSFETs M1, M2, and M3 have different resistance values, while gate voltages applied to MOSFETs N1, N2, and N3 have the same resistance value. As shown in FIG. 8, in the same manner as in the previous embodiments, the whole resistance value of each of resistors R, R, and R is considered as that of gate resistor of the associated one of the MOSFETs N1, N2, and N3. However, only a is first portion of the whole resistance value of the resistor R is considered as that of gate resistor of the MOSFET M1. Only a second portion of the whole resistance value of the resistor R is considered as that of gate resistor of the MOSFET M2. The second portion is greater than the first portion. The whole resistance value of the resistor R is considered as that of gate voltage of the MOSFET M3. In other words, the resistance values considered to contribute to voltage build-up at the gates of the MOSFETs M1, M2, and M3 are determined in a manner as a predetermined function of x-position of the photodiode which each of the MOSFETs M1, M2, and M3 is connected to. According to this predetermined function, the resistance value is proportional to x-position of photodiode. Owing to this arrangement, gate voltage of one of the MOSFETs M1, M2, and M3 that is connected to a photodiode D1 or D2 or D3 under illumination is indicative of x-position of the photodiode. Since the MOSFETs M1, M2, and M3 have the same amplification factor, the output voltage of the one of them indicates x-position of the photodiode under illumination. According to this third embodiment, the train of resistors LA, LA, and LA or LA, LA', and LA is not used thereby making a great contribution to suppression of occurrence of thermal noise.

Figure 9:
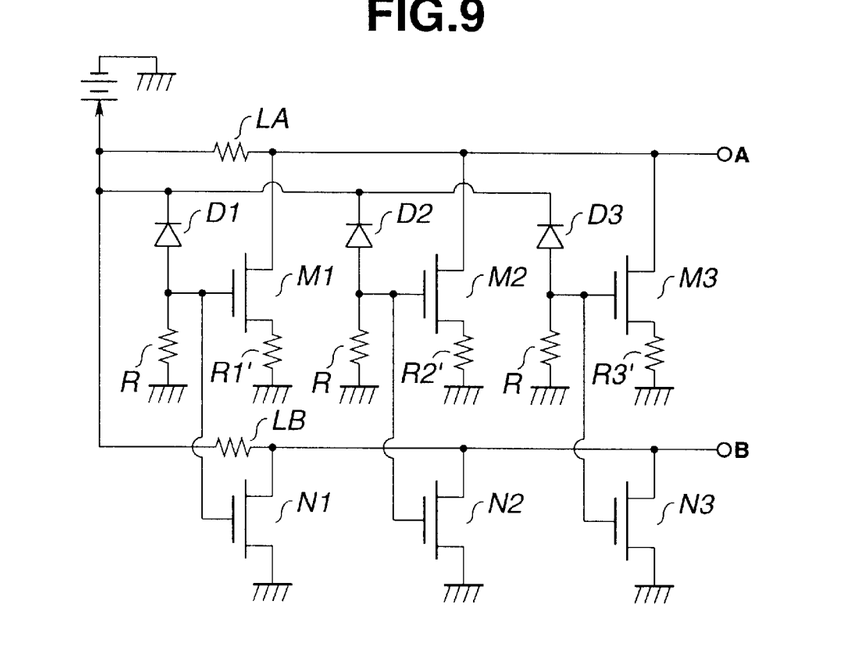
FIG. 9 shows an equivalent circuit of a fourth preferred embodiment of a position sensor according to the present invention.

FIG. 9 shows the fourth embodiment according to the present invention. In the same manner as the third embodiment differs from the first embodiment, the fourth embodiment is different from the latter to the extent that A-output is generated without relying on the train of resistors LA, LA, and LA (or LA, LA' and LA). Besides, the drains of MOSFETs M1, M2, and M3 are connected to source of voltage via a resistor LA and connected to A output terminal. The resistor LA has a resistance value of ra.

In FIG. 9, this fourth embodiment is different from the first embodiment also in that different resistors R1', R2', and R3' are connected to sources of MOSFETs M1, M2, and M3. This arrangement provides feedback by the source resistors thereby giving each of amplification factors of the MOSFETs M1, M2, and M3 as a function of x-position of the associated photodiode D1 or D2 or D3. In general, if the source voltage has a reistance value r', an amplification of MOSFET is given by ra/r'. Resistance values of the source resistors R1', R2' and R3' are given by terms of a harmonic series. When the resistance values are given as above, amplification factors of the MOSFETs M1, M2, and M3 become indicative of x-position of the associated photodiodes D1, D2, and D3. According to this fourth embodiment, feedback improves stable operation of the MOSFETs M1, M2, and M3.

Figure 10:
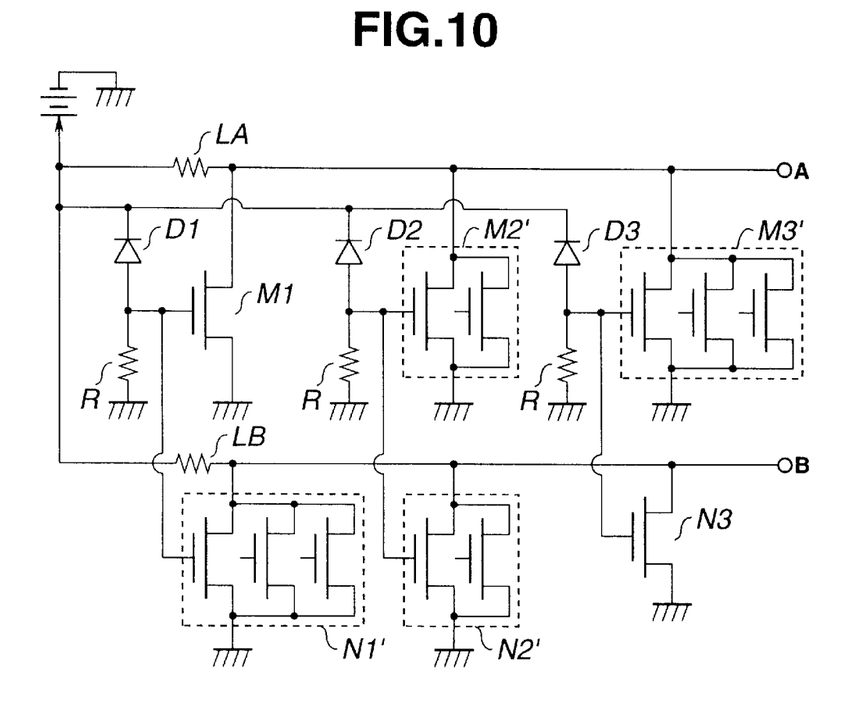
FIG. 10 shows an equivalent circuit of a fifth preferred embodiment of a position sensor according to the present invention.

FIG. 10 shows the fifth embodiment. In this embodiment, the train of resistors, which are connected to the drains of the MOSFETs M1, M2, and M3. What is connected to drains of MOSFETs M1, M2', and M3' is a single resistor LA. What is connected to drains of MOSFETs M1, M2', and M3' is a single resistor LB. As viewed in FIG. 10, MOSFETs M1, M2', and M3' have different channel widths that increase in progression as the distance of x-position from the left-hand end increases. If desired, MOSFETs N1', N2', and N3 may have different channel widths which increase in progression as the distance of x-position from the right-hand end increases. In FIG. 10, the number of symbol of MOSFET arranged in parallel indicates the channel width. With this arrangement, MOSFETs M1, M2', and M3' have transconductances gm that vary directly as the distance of x-position from the left-hand end increases, MOSFETs N1', N2', and N3 have transconductance gm that vary directly as the distance of x-position from the right-hand end increases. This provides output characteristic as shown in FIG. 15. According to the present invention, MOSFETs N1', N2', and N3 have the same transconductance gm. According to this embodiment, thermal noise can be suppressed thereby providing increased signal to noise (S/N) ratio.

Figure 11:
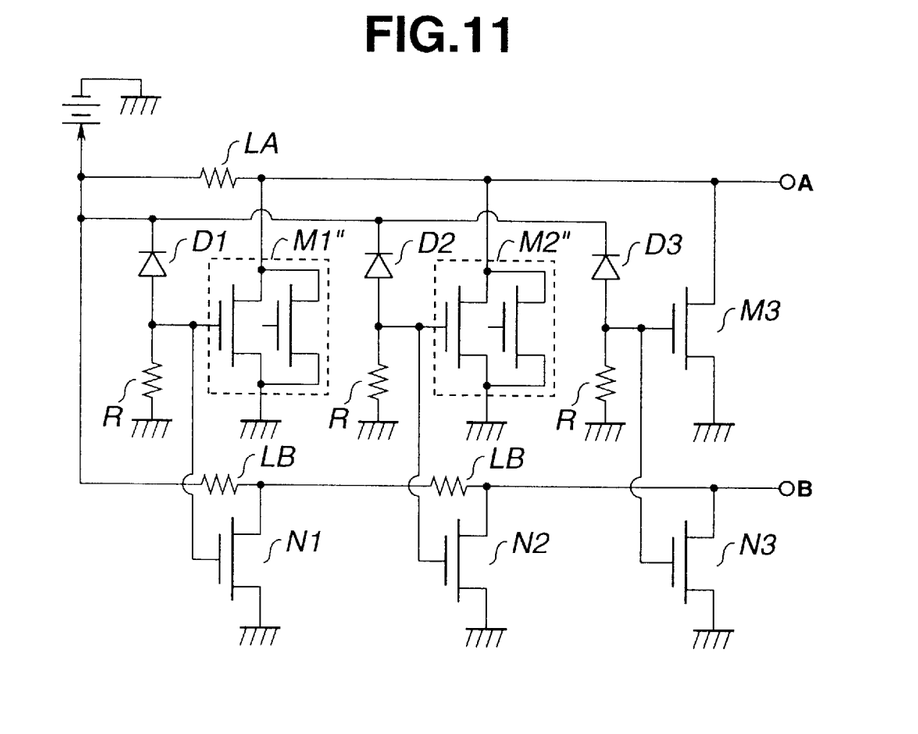
FIG. 11 shows an equivalent circuit of a sixth preferred embodiment of a position sensor according to the present invention.
Figure 12:
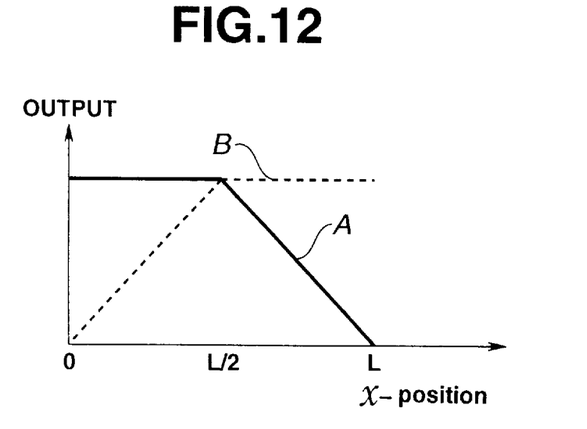
FIG. 12 shows an output characteristic chart according to sixth preferred embodiment.

FIG. 11 shows the sixth embodiment. This embodiment provides increased resolution by giving output characteristic as shown in FIG. 12. In FIG. 11, MOSFETs M1" and M2" have the same channel width that is twice as wide as channel width of MOSFET M3. They are connected at their drains to source of voltage via a single resistor LA and directly to A-output terminal. MOSFET N1 is connected at its drain to source of voltage via a resistor LB. MOSFET N2 is connected at its drain to source of voltage via another resistor LB in addition to the previously mentioned resistor LB. MOSFET N3 is connected at its drain to source of voltage via the above mentioned two resistors LB and LB.

This arrangement provides the output characteristic as shown in FIG. 12. In FIG. 12, A-output is kept as high as a maximum level of the output when x-position varies between 0 and L/2. The A-output is inversely proportional to variation of x-position beyond L/2. It assumes a minimum or zero level of the output when x-position is L. B-output takes the minimum level of the output when x-position is 0. The B-output varies directly as x-position varies between 0 and L/2. It is kept as high as the maximum level of the output when x-position varies beyond L/2. Comparing the output characteristic shown in FIG. 12 with that shown in FIG. 2 reveals that the resolution with respect to changes in x-position can be doubled.

The position sensor that shows the output characteristic shown in FIG. 12 require a signal processing circuit that is slightly different from the signal processing circuit shown in FIG. 3. This signal processing circuit required should include, in addition to and prior to the divider, a switch between numerator and denominator. Preferably, a larger one of A-output and B-output is set as denominator. This operation is easier and quicker than the addition and subtraction.

Figure 13:
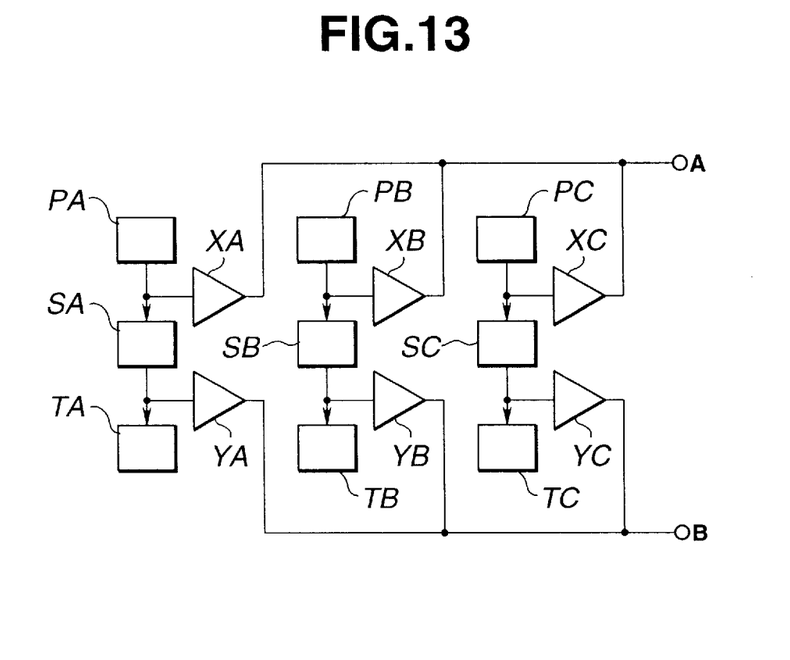
FIG. 13 shows an equivalent circuit of a seventh preferred embodiment of a position sensor according to the present invention.
Figure 14:
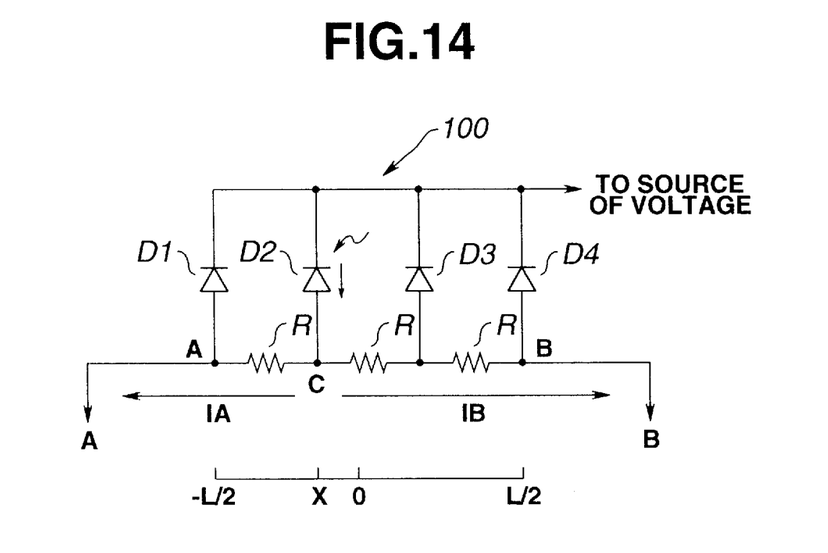
FIG. 14 shows an equivalent circuit of the less preferred embodiment discussed before.

FIG. 13 shows the seventh embodiment. In FIG. 13, PA, PB, and PC designate photodetectors that can convert optical signals, such as light, into electrical signals, such as photogenerated current. The photodetectors, which may be in the form of photodiodes or phototransistors, PA, PB, and PC are situated in a row over a straight line segment having a length L. Current-to-voltage converters SA, SB, and SC and TA, TB, and TC, which may be in the form of resistors, are devices that convert the photogenerated current to voltage. The photodetectors PA, PB, and PC are grounded via a series connected current-to-voltage converters SA and TA, a series connected SB and TB, and a series connected current-to-voltage converters XC and YC, respectively. Connected directly to the photodetectors PA, PB, and PC are amplifiers XA, XB, and XC, respectively. These amplifiers XA, XB, and XC are connected at their output terminals to A-output terminal. Connected to a point between the converters SA and TA is an amplifier YA. Connected to a point between the converters SB and TB is an amplifier YB. Connected to a point between the converters SC and TC is an amplifier YC.

Theses amplifiers YA, YB, and YC are connected at their output terminals to B-output terminal. The amplifiers XA, XB, and XC and amplifiers YA, YB, and YC are preferably in the form of MOSFETs of the source grounded type or the gate grounded type.

Any desired output characteristic can be obtained by setting conversion ratio of each of the current-to-voltage converters SA, SS, SC, TA, TB, and TC and amplification factor or ratio of each of the amplifiers XA, XB, XC, YA, YB, and YC in a manner determined as a function of x-position, For example, A-output becomes proportional to x-position. If the conversion ratio of each of the current-to-voltage converters SA, SB, and SC and the amplification ratio of each of the amplifiers XA, XB, and XC are determined as a square root of x-position, Assuming that x-positions of the photodetectors PA, PB, and PC are 1, 2, and 3, respectively, the conversion ratios and amplification ratios are as follows:

$SA:SB:SC=1:1414:1.732,$ $SA:SB:XC=1:1414:1.732,$

Thus, $SA+XA:SB+XB:SC+XC=2:2.282:4.464.$

If, with the amplification ratios of the amplifiers XA, XB, and XC kept unaltered, the conversion ratios of the current-to-voltage converters SA, SB, and SC are determined in proportional relation to x-position, the results are as follows:

$SA:SB:SC=1:2:3,$ $SA:XB:XC=1:1:1.$

Thus, $SA+XA:SB+XB:SC+XC=2:3:4.$

As will now be appreciated, determining the conversion and amplification ratios as square root of x-position is advantageous in that increase of sum of conversion ratio of current-to-voltage converter and amplification ratio of amplifiers can be suppressed. Since the size of integrated circuit is proportional to the above-mentioned conversion ratio and amplification ratio, the size of circuit integrating the components of the position sensor can be reduced.

From the preceding description, it will now be appreciated that photogenerated current is amplified in a manner determined as a function of x-position to give position-dependent first output, and it is amplified regardless of x-position to give position-independent second output thereby making calculation of the x-position easy.

What is claimed is:

1. A position sensor comprising:

a plurality of photodetectors in a row, each of said plurality of photodetectors being operative to convert optical energy of incident light that falls thereon to electrical energy to generate an electrical signal;

a first amplifier circuit operative to amplify the generated electrical signal to produce a first output signal that depends on which of said plurality of photodetectors the incident light falls on; and a second amplifier circuit operative to amplify the generated electrical signal to produce a second output signal that is independent of which of said plurality of photodetectors the incident light falls on.

2. A position sensor as claimed in claim 1, wherein each of said plurality of photodetectors is in the form of a photodiode.

3. A position sensor as claimed in claim 1, wherein each of said plurality of photodetectors is in the form of one of a photodiode and a phototransistor.

4. A position sensor as claimed in claim 1,
wherein a plurality, corresponding in number to said plurality of photodetectors, of current-to-voltage converters are connected to said plurality of photodetectors, respectively;
wherein said first amplifier circuit includes a plurality, corresponding in number to said plurality of photodetectors, of first amplifiers that are connected at input sides thereof to said plurality of current-to-voltage converters, respectively;
wherein said plurality of first amplifiers are connected at output sides thereof to a source of voltage in parallel with a resistor between the adjacent two thereof thereby increasing amplification ratios of said plurality of first amplifiers as the number of resistor increases;
wherein said second amplifier circuit includes a plurality, corresponding in number to said plurality of photodetectors, of second amplifiers that are connected at input sides thereof to said plurality of current-to-voltage converters, respectively;
wherein said plurality of second amplifiers are connected at output sides thereof to the source of voltage in parallel thereby leaving amplification ratio of each of said plurality of second amplifiers unaltered; and
wherein said output sides of said plurality of first amplifiers are connected to a first output terminal thereby allowing said first output signal to develop at said first output terminal, and said output sides of said plurality of second amplifiers are connected to a second output terminal thereby allowing said second output signal to develop at said second output terminal.

5. A position sensor as claimed in claim 4, wherein said resistors, each of which is connected between the output sides of the adjacent two of said plurality of first amplifiers, have the same resistance value.

6. A position sensor as claimed in claim 4, wherein said resistors, each of which is connected between the output sides of the adjacent two of said plurality of first amplifiers, have different resistance values.

7. A position sensor as claimed in claim 1,
wherein a plurality, corresponding in number to said plurality of photodetectors, of current-to-voltage converters are connected to said plurality of photodetectors, respectively;
wherein said first amplifier circuit includes a plurality, corresponding in number to said plurality of photodetectors, of first amplifiers that are connected at input sides thereof to said plurality of current-to-voltage converters, respectively, and a plurality, corresponding in number to said plurality of first amplifiers, of resistors that are connected to said plurality of first amplifiers, respectively;
wherein said plurality of first amplifiers are connected at output sides thereof to a source of voltage in parallel, and said plurality of resistors have different resistance values that are determined as a function of positions at which the corresponding photodetectors are situated in the row thereby varying amplification ratios of said plurality of first amplifiers;
wherein said second amplifier circuit includes a plurality, corresponding in number to said plurality of photodetectors, of second amplifiers that are connected at input sides thereof to said plurality of current-to-voltage converters, respectively;
wherein said plurality of second amplifiers are connected at output sides thereof to the source of voltage in parallel thereby leaving amplification ratio of each of said plurality of second amplifiers unaltered; and
wherein said output sides of said plurality of first amplifiers are connected to a first output terminal thereby allowing said first output signal to develop at said first output terminal, and said output sides of said plurality of second amplifiers are connected to a second output terminal thereby allowing said second output signal to develop at said second output terminal.

8. A position sensor as claimed in claim 1,
wherein a plurality, corresponding in number to said plurality of photodetectors, of current-to-voltage converters are connected to said plurality of photodetectors, respectively;
wherein said first amplifier circuit includes a plurality, corresponding in number to said plurality of photodetectors, of first amplifiers that are connected at input sides thereof to said plurality of current-to-voltage converters, respectively;
wherein said plurality of first amplifiers have different amplification ratios;
wherein said plurality of first amplifiers are connected at output sides thereof to a source of voltage in parallel;
wherein said second amplifier circuit includes a plurality, corresponding in number to said plurality of photodetectors, of second amplifiers that are connected at input sides thereof to said plurality of current-to-voltage converters, respectively;
wherein said plurality of second amplifiers are connected at output sides thereof to the source of voltage in parallel; and
wherein said output sides of said plurality of first amplifiers are connected to a first output terminal thereby allowing said first output signal to develop at said first output terminal, and said output sides of said plurality of second amplifiers are connected to a second output terminal thereby allowing said second output signal to develop at said second output terminal.

9. A position sensor comprising:
a plurality of photodetectors arranged in a row, each of the row of photodetectors being operative to convert optical energy of incident light that falls thereon into electrical energy and to generate an electrical signal;
a first amplifier circuit operative in response to the incident light to amplify the generated electrical signal; and
a second amplifier circuit operative in response to the incident light to amplify the generated electrical signal;
said first amplifier circuit having an amplification ratio which is unaltered and said second amplifier circuit having an amplification ratio which is variable when a localized light spot of the incident light is moved over a first portion of the row of photodetectors;
said amplification ratio of said first amplifier circuit being variable and said amplification ratio of said second amplifier circuit being unaltered when the localized spot is moved over a second portion of the row of photodetectors,
said first and second amplifier circuits being each connected at one end to a source of voltage and each connected at an opposite end to corresponding output terminals, respectively.

10. A position sensor as claimed in claim 9,
wherein said first amplifier circuit includes a plurality of first amplifiers connected at output sides thereof one after another, said plurality of first amplifiers providing different amplification factors when the localized light spot is moved over the first portion of the row of photodetectors, said plurality of first amplifiers providing the same amplification factor when the localized light spot is moved over the second portion of the row; and
wherein said amplifier circuit includes a plurality of second amplifiers, said plurality of second amplifiers being connected at output sides thereof one after another when the localized light spot is moved over the first half of the row, said plurality of second amplifiers being connected at output sides thereof one after another with a resistor between an adjacent two thereof.

11. A position sensor comprising:
a plurality of photodiodes in a row, each of said plurality of photodiodes being circuited to convert optical energy of incident light that falls thereon to electrical energy and to generate an electrical signal;
a plurality of first amplifiers operative to amplify the generated electrical signal and to produce a first output signal that depends on which of said plurality of photodiodes the incident light falls on; and
a plurality of second amplifiers operative to amplify the generated electrical signal to produce a second output that is independent of which of said plurality of photodiodes the incident light falls on.

12. A position sensor as claimed in claim 11,
wherein said plurality of first amplifiers are first MOSFETs of the source grounded type, which are connected at gates thereof to said plurality of photodiodes, respectively, and connected at drains thereof in parallel to a source of voltage with a resistor between the adjacent two thereof;
wherein said plurality of second amplifiers are second MOSFETs of the source grounded type, which are connected at gates thereof connected to said plurality of photodiodes, respectively, and connected at drains thereof in parallel to the source of voltage; and
wherein said drains of said first MOSFETs are connected to a first output terminal, and said drains of said second MOSFETs are connected to a second output terminal.

13. A position sensor as claimed in claim 12, further comprising:
a divider connected to said first and second output terminals.

14. A position sensor as in claim 11,
wherein said plurality of first amplifiers are first MOSFETs of the gate grounded type, which are connected at sources thereof to said plurality of photodiodes, respectively, and connected at drains thereof in parallel to a source of voltage with a resistor between the adjacent two thereof;
wherein said plurality of second amplifiers are second MOSFETs of the gate grounded type, which are connected at sources thereof connected to said plurality of photodiodes, respectively, and connected at drains thereof in parallel to the source of voltage; and
wherein said drains of said first MOSFETs are connected to a first output terminal, and said drains of said second MOSFETs are connected to a second output terminal.

15. A position sensor as claimed in claim 12, further comprising:
a first buffer provided to prevent any interference from propagating into said drains of said first MOSFETs through said first output terminal; and
a second buffer provided to prevent any interference from propagating into said drains of said second MOSFETs through said second output terminal.

16. A position sensor as claimed in claim 12,
wherein said resistors, each being connected between the adjacent two of said drains of said first MOSFETs, have different resistance values.

17. A position sensor as in claim 11,
wherein said plurality of first amplifiers are first MOSFETs, which are connected at gates thereof to said plurality of photodiodes, respectively, and connected at sources thereof to the ground via resistors with different resistance values, respectively, and connected at drains thereof in parallel to a source of voltage
wherein said plurality of second amplifiers are second MOSFETs of the source grounded type, which are connected at gates thereof connected to said plurality of photodiodes, respectively, and connected at drains thereof in parallel to the source of voltage; and
wherein said drains of said first MOSFETs are connected to a first output terminal, and said drains of said second MOSFETs are connected to a second output terminal.

18. A position sensor as claimed in claim 11,
wherein said plurality of first amplifiers are first MOSFETs of the source grounded type, which are connected at gates thereof to said plurality of photodiodes, respectively, and connected at drains thereof in parallel to a source of voltage;
wherein said plurality of second amplifiers are second MOSFETs of the source grounded type, which are connected at gates thereof connected to said plurality of photodiodes, respectively, and connected at drains thereof in parallel to the source of voltage;
wherein said drains of said first MOSFETs are connected to a first output terminal, and said drains of said second MOSFETs are connected to a second output terminal; and
wherein said first MOSFETs have different channel widths.

19. A position sensor as claimed in claim 18,
wherein said second MOSFETs have different channel widths.

20. A position sensor as claimed in claim 11,
wherein said plurality of first amplifiers are first MOSFETs of the source grounded type, which are connected at gates thereof to said plurality of photodiodes, respectively, and connected at drains thereof in parallel to a source of voltage;
wherein said plurality of second amplifiers are second MOSFETs of the source grounded type, which are connected at gates thereof connected to said plurality of photodiodes, respectively, and connected at drains thereof in parallel to the source of voltage;
wherein said drains of said first MOSFETs are connected to a first output terminal, and said drains of said second MOSFETs are connected to a second output terminal; and wherein said gates of said first MOSFETs are connected to said plurality of photodiodes, respectively, via respective current-to-voltage converters with different conversion ratios.

21. A position sensor comprising:

a plurality of photodetectors in a row along a straight line segment having a predetermined length, each of said plurality of photodetectors being operative to convert optical energy of incident light that falls thereon into electrical energy and to generate an electrical signal;

means for producing a first output that depends on which of said plurality of photodetectors the incident light falls on;

means for producing a second output signal that is independent of which of said plurality of photodetectors the incident light falls on; and a divider receiving said first and second signals.

22. A method of locating a position on a row of a plurality of photodetectors, at which incident light falls on the plurality of photodetectors, comprising the steps of:

producing a first output signal that depends on which of the plurality of photodetectors the incident light falls on;

producing a second output signal that is independent of which of the plurality of photodetectors the incident light falls on; and calculating a ratio between said first and second output signals as position information.

* * * * *